United States Patent

Rodskier et al.

Patent Number: 5,514,011
Date of Patent: May 7, 1996

[54] PROPELLER ARRANGEMENT FOR A MARINE PROPULSION UNIT

[75] Inventors: Christian Rodskier, Torslanda; Stig Johansson, Gothenburg; Oddbjörn Hallenstvedt, Köping, all of Sweden

[73] Assignee: AB Volvo Penta, Gothenburg, Sweden

[21] Appl. No.: 256,780

[22] PCT Filed: Feb. 12, 1993

[86] PCT No.: PCT/SE93/00110

§ 371 Date: July 25, 1994

§ 102(e) Date: Sept. 21, 1994

[87] PCT Pub. No.: WO93/15952

PCT Pub. Date: Aug. 19, 1993

[30] Foreign Application Priority Data

Feb. 13, 1992 [SE] Sweden ................... 9200427

[51] Int. Cl.⁶ ................................................ B63H 1/14
[52] U.S. Cl. .............. 440/49; 416/204 R; 416/244 B; 440/80
[58] Field of Search .................. 440/79, 80, 81, 440/83, 49; 416/2, 244 B, 204 R, 128, 129 R, 129 A, 244 R, 245 A; 411/279, 282, 176, 180, 181, 183, 184

[56] References Cited

U.S. PATENT DOCUMENTS

| | | | |
|---|---|---|---|
| 2,351,356 | 6/1944 | Meyer | 416/245 A |
| 3,444,932 | 5/1969 | Wlezien | 416/244 B |
| 4,897,058 | 1/1990 | McCormick | 416/129 X |
| 5,022,875 | 6/1991 | Karls | 440/49 |
| 5,154,559 | 10/1992 | Wagner | 403/282 X |

FOREIGN PATENT DOCUMENTS

| | | | |
|---|---|---|---|
| 0002806 | 2/1908 | United Kingdom | 416/245 A |
| 9315950 | 8/1993 | WIPO | 440/80 |
| 9315952 | 8/1993 | WIPO | 440/80 |

*Primary Examiner*—Sherman Basinger
*Attorney, Agent, or Firm*—Burns, Doane, Swecker & Mathis

[57] ABSTRACT

A propeller has a hub affixed to a propeller shaft so as to rotate therewith. The hub is axially locked by a locking arrangement consisting of a lock nut screwed on to the shaft and a lock screw screwed into the end of the shaft to lock the nut. The screw is tightened more than the nut in order to cause the thread on the nut to load the opposite thread flank on the shaft. A portion of the nut which is deformed during tightening of the screw holds the nut and screw together during subsequent removal of the propeller.

7 Claims, 1 Drawing Sheet

PROPELLER ARRANGEMENT FOR A MARINE PROPULSION UNIT

BACKGROUND OF THE INVENTION

The present invention relates to a propeller arrangement for a marine propulsion unit, comprising at least one propeller shaft which carries a propeller hub, said hub presenting a sleeve member secured to the shaft so as to rotate therewith, which sleeve member is axially located on the shaft by means of both a nut abutting the sleeve member and cooperating with an external thread on the shaft, and a screw which is screwed into a threaded bore in the shaft, with the head of the screw abutting the nut.

A propeller arrangement of this type is already known in which the nut is tightened with a high tightening torque using a first tool so as to axially secure the propeller hub. A screw is screwed into the bore at the shaft's end and tightened using another tool so as to lock the nut. When the propeller is to be removed, the screw must first be loosened with the one tool and the nut loosened with the second before the propeller can be slid off the shaft. Should the propeller need to be exchanged when the boat is in water, then it is disadvantageous to require several tools and fasteners, since objects which may be dropped in the water during this operation are virtually impossible to find.

OBJECTS AND SUMMARY

It is therefore an object of the present invention to provide a propeller arrangement of the type mentioned in the introduction, which has a lock-nut arrangement which effectively locks the propeller whilst no more than one tool is needed for the fitting and removal of the propeller.

This object is achieved in accordance with the present invention by means of a propeller arrangement of the type mentioned in the introduction, in which the screw is tightened so that the head of the screw exerts an axial force on the nut which unloads the nut and changes the loading of the nut thread on the shaft thread to the opposite thread flank on the shaft thread.

In engineering terms, this means that, compared to the previously known arrangement, the screw is upgraded in order to be able to accommodate greater loads. During the fitting of the propeller, in principle it is sufficient that the nut be tightened by hand to take up any free play and to centre the hub on the shaft, whereafter the screw is firmly tightened with a tool so that the thread of the nut exerts a force on the opposite thread flank on the shaft.

In a further development of the propeller arrangement according to the invention, a flange is provided around an entrance to the bore through the nut on the surface of the nut facing the screw head, which flange, after insertion of the screw in the nut, is caused to deform inwardly to reduce the diameter of the entrance to the bore. Such a reduction of diameter can be advantageously used to hold the screw and nut together so that during removal of the propeller the screw and nut can be handled as a single component. Once the screw has been loosened with a tool, the nut can be loosened by hand, with the screw being held by the nut so that no risk of dropping the screw arises.

BRIEF DESCRIPTION OF THE DRAWINGS

The invention will be described in greater detail with reference to the embodiment shown in the attached drawings, in which.

DETAILED DESCRIPTION OF THE PREFERRED EMBODIMENTS

Figure 1:
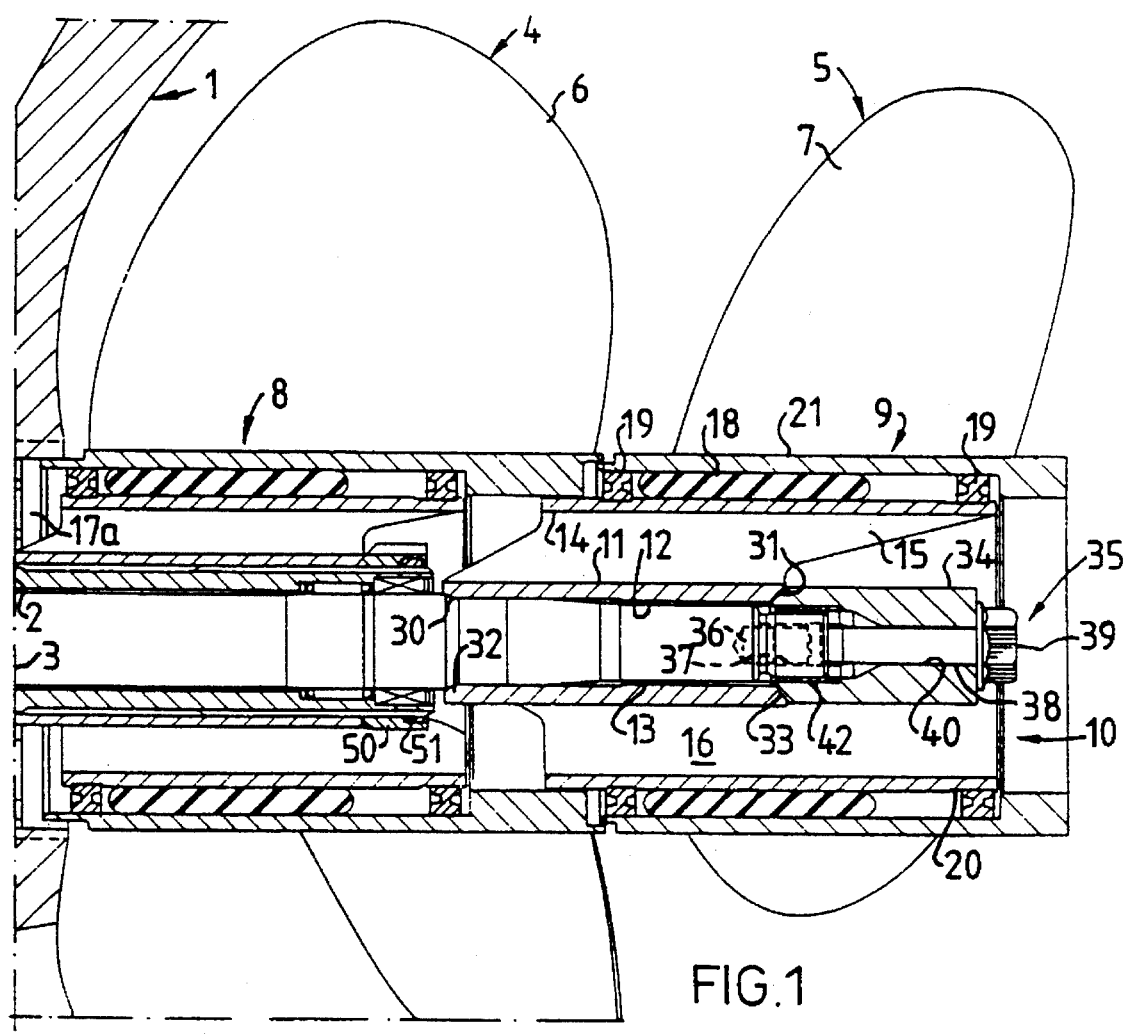
FIG. 1 is a longitudinal sectional view of an embodiment of a propeller arrangement according to the invention and its communication with the lower stern region of a stern-drive unit.

In FIG. 1, reference numeral 1 denotes a lower wall region of a stern-drive unit, for example of the Aquamatic® type, which is connected to a not-shown internal combustion engine. A first tubular propeller shaft 2 and a second propeller shaft 3 are concentrically rotatably supported in the drive unit and connected to a drive shaft in a known manner via a not-shown conical gear arrangement so that the propeller shafts are driven in opposite directions. Each propeller shaft 2 and 3 carries a propeller, generally denoted by 4 and 5 respectively, which comprises blades 6 and 7 resp. and a hub 8 and 9 resp.

The propeller hub 9 presents an inner sleeve member 10 which consists of, on the one hand, an inner sleeve 11 with internal splines for engagement with corresponding external splines 13 on the tube shaft 2 and, on the other hand, an outer sleeve 14 which is connected to the inner sleeve 11 via axial webs 15. The sleeves 11, 14 and the webs 15 together delimit three exhaust passages 16 which communicate with an exhaust pipe in the drive unit via an opening 17a in the wall region 1 concentric with the propeller shafts 2, 3. A rubber bushing 18 is cured or adhered to the outer surface of the outer sleeve 14 and a pair of spacer rings 19 of a relatively hard plastic material are affixed to the sleeve 14, with one ring 19 to each side of the bushing 18. The position of the spacer rings 19 is determined by shallow circumferential grooves 20 in which the rings sit. The outer diameter of the distance rings 19 is equal to the inner diameter of the outer sleeve member 21 to which the propeller blades 6 are affixed. The bushing 18 is fixedly adhered or cured to the outer sleeve 21 and serves as a torsion member, whilst the distance rings 19 take up radial loads.

The inner sleeve 11 has conical end surfaces 30 and 31 and is clamped between a conical surface 32 on the shaft 3 and a conical surface 33 on a lock nut 34 which is screwed on a threaded end of the shaft 3. The lock nut 34 is secured by a screw 35 which is screwed into a threaded bush 36 in the end of the shaft 3.

The nut 34 has a smooth bore 40 which merges with a threaded bore 41 of larger diameter. A threaded insert 42 is screwed into the threaded bore. A shoulder or flange 43 of triangular-shaped cross-section extends around the entrance 40a to the smooth bore 40.

The screw 35 has a threaded outer shank region 37, the outer diameter of which is slightly smaller than the inner diameter of the bore 41 so that the screw 35 can be freely slid through the bore 41. The screw 35 has an unthreaded shank region 38 between the threaded region 37 and its head 39. The region 38 has a reduced diameter in relation to the region 37 and is thus accommodated with clearance in the bore 41.

Figure 2:
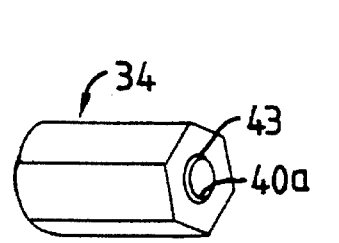
FIG. 2 is a perspective view of a lock nut.
Figure 3:
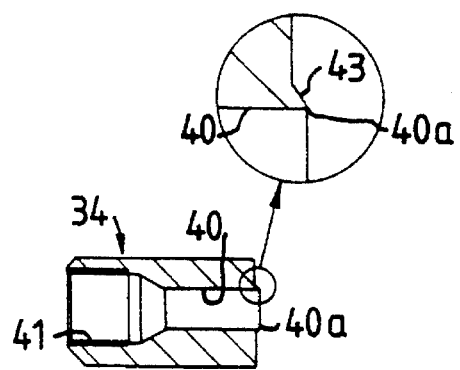
FIG. 3 is a longitudinal sectional view through the nut of FIG. 2 with an enlargement of the circled region.

When the propeller 5 is first attached to the shaft 3, a nut 34 having the form shown in FIGS. 2 and 3 is screwed onto the end of the shaft and sufficiently tightened to eliminate any axial play. This tightening can normally be performed without recourse to a tool, i.e. by using one's fingers.

Thereafter, the screw 35 is screwed into the end of the shaft with a high tightening torque using a tool, preferably a torque wrench, so that the thread of the nut is unloaded from the outer thread flank of the thread on the shaft and instead loads the inner thread flank on the shaft thread, whereby an effective locking of the propeller is attained. The conical surfaces on the hub sleeve 11 and the nut 34 assist in radially aligning the propeller on the shaft and also contribute to the locking of the nut, thanks to their wedging action.

After the screw 35 has been inserted into the nut 34, the head 39 of the screw is pressed tightly against the shoulder 43 so that the shoulder, due to its shape, is upset radially inwardly and thereby reduces the diameter of the entrance 40a to the bore 40. If the propeller later has to be removed, it is sufficient to use just one tool to loosen the screw 35 and to screw it out. The deformed shoulder 43 will thus act as a stop for the threaded region 37 of the shank, which has a larger diameter than the entrance 40a, thereby retaining the screw within the nut 34 when the nut is later screwed off the shaft by hand.

By means of the invention, a simple and effective locking arrangement is provided which can be handled as one component and requires the use of just one tool. The locking arrangement 34, 35 cannot be used on the leading propeller 4 of the twin propeller arrangement shown in FIG. 1 since the leading propeller 4 is carried on a hollow shaft 2. The propeller 4 is axially located by means of a lock nut 50, in the rear threaded portion of which a friction device 51 is provided for locking the nut.

In terms of the locking arrangement 34, 35 according to the invention, this can of course be used for a propeller drive unit having just one propeller.

We claim:

1. A propeller arrangement for a marine propulsion unit, comprising:

a propeller hub;

a propeller shaft which carries the propeller hub, said propeller shaft having an external thread and a threaded bore with an inner thread therein, said external thread having an inner flank and an outer flank;

said hub including a sleeve member secured to the shaft so as to rotate therewith;

said sleeve member is axially located on the propeller shaft by means of both a nut abutting the sleeve member and cooperating with the external thread on the shaft, and a screw which is screwed into the threaded bore in the shaft, with a head of the screw abutting the nut;

the screw being tightened so that the head of the screw exerts an axial force on the nut which unloads the nut and changes a loading of a thread of the nut from the outer flank of the external shaft thread to the inner flank of the external shaft thread.

2. Propeller arrangement according to claim 1, wherein said nut has a threaded bore and a flange is provided around an entrance to the threaded bore through the nut on the surface of the nut facing the screw head, which flange, after insertion of the screw in the nut, is caused to deform inwardly to reduce the diameter of the entrance to the bore.

3. Propeller arrangement according to claim 2, wherein the screw has a shank with a threaded region and an unthreaded region, the unthreaded region being nearest the head of the screw and having a diameter smaller than the threaded region, and after deformation of the flange, said entrance in the nut has a smaller diameter than the threaded region of the screw.

4. Propeller arrangement according to claim 3, wherein facing surfaces of the sleeve member and the nut are conical.

5. Propeller arrangement according to claim 2, wherein facing surfaces of the sleeve member and the nut are conical.

6. Propeller arrangement according to claim 1, wherein facing surfaces of the sleeve member and the nut are conical.

7. A propeller arrangement for a marine propulsion unit comprising:

a propeller hub;

a propeller shaft which carries the propeller hub, said propeller shaft having an external thread and a threaded bore with an inner thread therein, said external thread having an inner flank and an outer flank;

said hub including a sleeve member secured to the shaft so as to rotate therewith;

a nut threaded onto said shaft external thread and including means for exerting an axial force on the sleeve to maintain the sleeve in an axial position along the shaft; and means threadably engaged with said shaft inner thread and contacting said nut for shifting the axial force from the outer flank of the shaft external thread to the inner flank of the shaft external thread so as to unload the nut from the outer flank of the shaft external thread.

* * * * *